United States Patent
Das

(10) Patent No.: US 12,423,130 B2
(45) Date of Patent: Sep. 23, 2025

(54) FACILITATING POWER MANAGEMENT OF A HARDWARE DEVICE BY A VIRTUAL MACHINE

(71) Applicant: RED HAT, INC., Raleigh, NC (US)

(72) Inventor: Bandan Das, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 468 days.

(21) Appl. No.: 18/080,841

(22) Filed: Dec. 14, 2022

(65) Prior Publication Data

US 2024/0202018 A1 Jun. 20, 2024

(51) Int. Cl.
G06F 9/455 (2018.01)
G06F 1/28 (2006.01)

(52) U.S. Cl.
CPC ............ G06F 9/45558 (2013.01); G06F 1/28 (2013.01); G06F 2009/4557 (2013.01)

(58) Field of Classification Search
CPC . G06F 9/45558; G06F 1/28; G06F 2009/4557
See application file for complete search history.

(56) References Cited

U.S. PATENT DOCUMENTS

| | | | |
|---|---|---|---|
| 9,015,711 B2 | 4/2015 | Tsirkin et al. | |
| 9,152,200 B2 | 10/2015 | Parthasarathy | |
| 10,282,226 B2 | 5/2019 | Warkentin et al. | |
| 10,936,039 B2 | 3/2021 | Guim Bernat et al. | |
| 11,157,289 B2 | 10/2021 | Regupathy et al. | |
| 2017/0285730 A1* | 10/2017 | Min | G06F 9/5083 |

FOREIGN PATENT DOCUMENTS

| | | |
|---|---|---|
| DE | 102015214415 A1 | 2/2017 |
| EP | 3627319 A1 | 3/2020 |

* cited by examiner

*Primary Examiner* — Wissam Rashid

(74) *Attorney, Agent, or Firm* — Kilpatrick Townsend & Stockton LLP

(57) ABSTRACT

Some examples can enable secure and efficient power management of a target hardware device by a virtual machine. For example, a first hypervisor supporting a first virtual machine can receive a first request from the first virtual machine. The first request can indicate a target power mode for the target hardware device assigned to the first virtual machine. In response to receiving the first request, the first hypervisor can transmit a second request indicating the target power mode for the target hardware device to a second hypervisor. The second hypervisor can forward the second request to a second virtual machine, and the second virtual machine can cause the target hardware device to enter the target power mode in response to receiving the second request.

17 Claims, 4 Drawing Sheets

400

402
Receive, by a first hypervisor supporting a first virtual machine, a first request from the first virtual machine indicating a target power mode for a target hardware device assigned to the first virtual machine

404
Transmit, by the first hypervisor, a second request indicating the target power mode for the hardware device to a second hypervisor, the second hypervisor being configured forward the second request to a second virtual machine, the second virtual machine being configured to cause the target hardware device to enter the target power mode in response to receiving the second request

FACILITATING POWER MANAGEMENT OF A HARDWARE DEVICE BY A VIRTUAL MACHINE

TECHNICAL FIELD

The present disclosure relates generally to power management and, more particularly (although not necessarily exclusively), to techniques for facilitating power management of a hardware device by a virtual machine.

BACKGROUND

A virtual machine can be a substantially isolated environment that has its own operating system, software applications, and virtualized hardware such as a virtual Central Processing Unit (vCPU) and a virtual Random Access Memory (vRAM). The virtual machine can run on a host machine. A hypervisor can enable the virtual machine to run on the host machine by allocating physical resources such as CPU, RAM, and storage space to the virtual machine. The hypervisor can be a software layer that is conceptually positioned above a physical layer (e.g., the hardware) of the host machine and below the virtual machine. The hypervisor can interface between the physical layer and the virtual machine.

DETAILED DESCRIPTION

Figure 1:
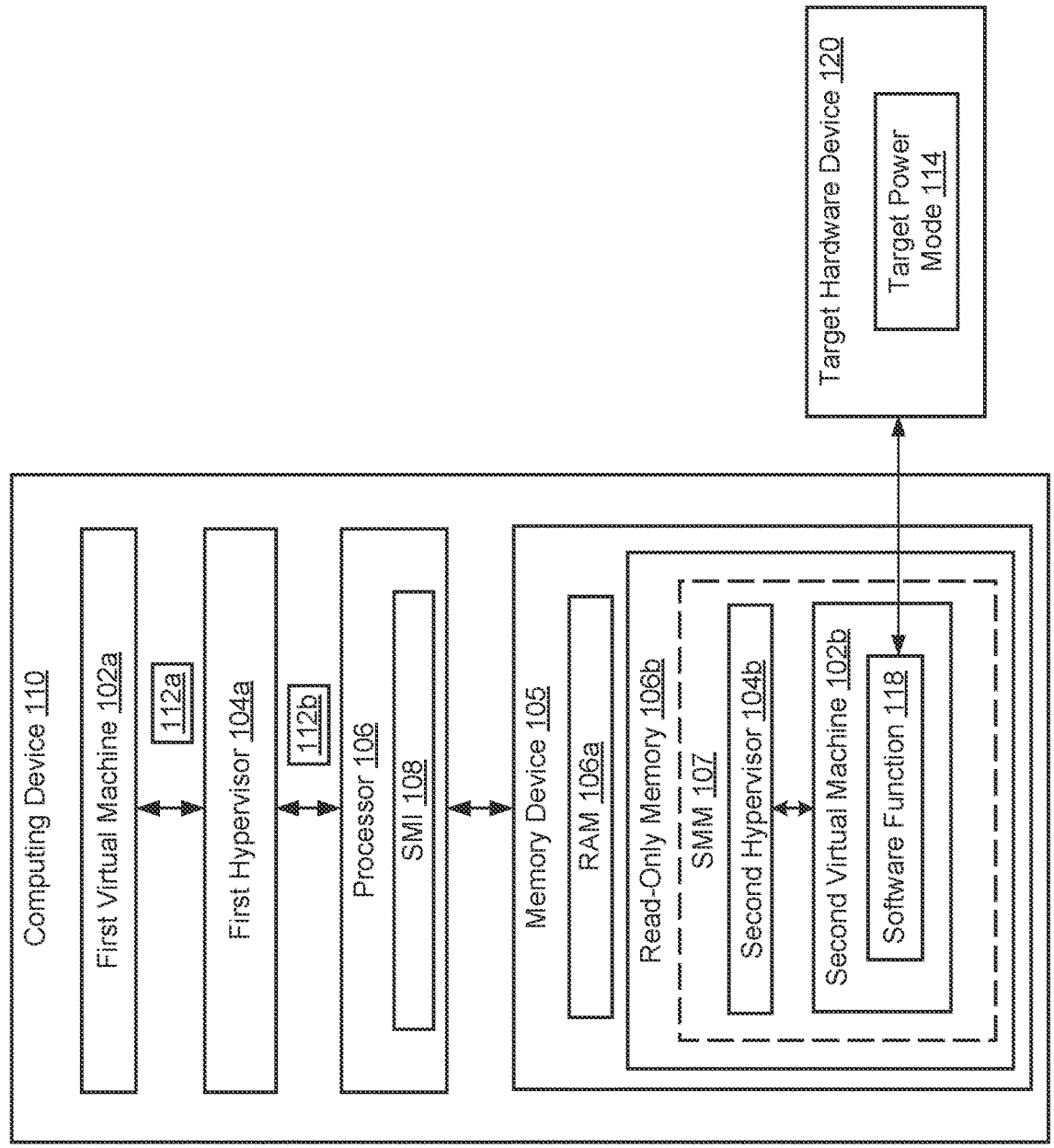
FIG. 1 is a block diagram of an example of a computing device for facilitating power management of a target hardware device by a virtual machine according to one example of the present disclosure.

In a conventional system, a virtual machine may be assigned a hardware device for use in various operations. For example, a virtual machine may be assigned a Network Interface Card (NIC) for use in network communications. Normally, the virtual machine has very little ability to control the power management of the hardware devices assigned to the virtual machine. For example, the computing device on which the virtual machine is running can have an Advanced Configuration and Power Interface (ACPI) that enables a host operating system (OS) to control power distribution to attached hardware devices. The ACPI may have a power management hook for controlling power distribution to the NIC. A guest driver can be installed as a link between the virtual machine and the host OS to enable the virtual machine to access the power management hook for the NIC. But, using the guest driver as a way to allow the virtual machine to perform power management can be inefficient and may be limited by the host OS. For example, the host OS may deny access to the guest driver due to a security risk of permitting the link between the guest OS and the host OS. Additionally, the host OS may limit the power-modes or other suitable information available to the virtual machine. In another example of a conventional system, the host OS can expose an interface to the guest OS, through which the guest OS can call into power management hooks via the ACPI. However, the conventional system may experience latency because a host hypervisor would have to go through the traditional ACPI stack of the host OS to perform a request for power management via the interface, which can be relatively slow. Additionally, exposing the interface can cause a security risk if, for example, a malicious guest exploits the interface because the malicious guest could potentially impact functions of the host OS.

Some examples of the present disclosure overcome one or more of the abovementioned issues by providing a system that can facilitate power management of a target hardware device by a virtual machine using a privileged hypervisor and a privileged guest (e.g., a privileged virtual machine). The privileged hypervisor can be a hypervisor that has higher privileges than the normal host hypervisor that is running on top of the host operating system to manage the virtual machine. The privileged hypervisor may be executed in a privileged area of memory by the host processor, for example when the host processor is running in a system management mode (SMM), so that the privileged hypervisor can perform privileged functions that may not be performable by the host hypervisor. The privileged guest can be managed by the privileged hypervisor in the system management mode. The privileged guest can have higher privileges than the normal virtual machine managed by the host hypervisor. The privileged guest may also be executed in the privileged area of memory by the host processor. The privileged hypervisor and privileged guest can have knowledge of the hardware devices associated with the computing device and power modes for the hardware devices. The privileged hypervisor and privileged guest can work together to cause the hardware devices to switch between power modes in response to requests, forwarded by the host hypervisor, from the virtual machine.

In some examples, the system can facilitate efficient power management by the virtual machine due to the privileged hypervisor and privileged guest having the same privilege level as a Basic Input/Output System (BIOS) of the computing device. Thus, the privileged hypervisor and privileged guest can bypass the host OS and directly call into power management hooks to cause a hardware device to enter a target power mode, which can be faster and more secure than conventional systems. Power management requests from the virtual machine can be contained in and facilitated by the privileged guest, which can improve security. For example, the target hardware device's memory can be identity mapped to the privileged guest's memory, so that the power management requests are all executed inside the privileged guest. This can help to contain a malicious request to the privileged guest so that it does not affect the host hypervisor or host OS. Using these techniques, latency can also be decreased because the ACPI stack of the host OS can be avoided. Moreover, the system can be a holistic solution to power management via the virtual machine rather than a device-specific solution.

In some examples, the host hypervisor can determine a first set of identifiers corresponding to the power modes for the hardware devices. The first set of power-mode identifiers can be the real identifiers for the power modes, as used by the hardware devices. The host hypervisor can then map the first set of power-mode identifiers to a second set of power-mode identifiers, which can be generated (e.g., randomly) by the host hypervisor for purposes of obfuscating the first set of power-mode identifiers. Therefore, the second set of power-mode identifiers can be different than the first set of power-mode identifiers. The host hypervisor can provide the second set of power-mode identifiers, rather than the first set of power-mode identifiers, to the virtual machine to obfuscate the real power-mode identifiers from the virtual machine, thereby improving security. When the virtual machine wants to request that the hardware device enter a target power mode, it can provide the corresponding second power-mode identifier to the host hypervisor. The host hypervisor can then use the mapping to convert the second power-mode identifier into the first power-mode identifier, and forward the first power-mode identifier to the privileged hypervisor for performing subsequent operations. In this way, the system can enable power management by the virtual machine without the security risk of providing the real power-mode identifiers to the virtual machine.

As one particular example, the virtual machine can determine that it wants the NIC to enter an idle mode or another low-power mode. In response, the virtual machine can transmit a request to the host hypervisor for causing the NIC to enter the low-power mode. The virtual machine may issue the request by executing a first virtual machine (VM) call, which can cause a VM exit to the host hypervisor. A VM call can be implemented by architecture of the computing device, and therefore executing the first VM call can automatically cause a processor to VM exit to the host hypervisor. The VM exit can transition control to the host hypervisor. In response to receiving the request from the virtual machine, the host hypervisor can forward the request the privileged hypervisor. The host hypervisor may forward the request by executing a second VM call. The second VM call can trigger the generation of a system management interrupt (SMI). The SMI can cause a processor, such as an x86 processor, to enter a system management mode (SMM). When in the SMM, the processor can execute the privileged hypervisor and the corresponding privileged guest. The privileged guest can be configured to interact with the firmware of the attached hardware devices. This can contain the power management functions, for example to protect the host OS and provide a secure and isolated solution for power management. As a result of the second VM call, the privileged hypervisor can receive the request. The privileged hypervisor may then perform one or more operations to determine that the request from the virtual machine is valid. After validating the request, the privileged hypervisor can forward the request to the privileged guest, which can call into the firmware of the target hardware device to cause the target hardware device to enter the low-power mode. In this way, the host hypervisor and the privileged hypervisor can work together to allow the virtual machine to control the power consumption of an assigned hardware device.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing device 110 for facilitating power management of a target hardware device 120 by a virtual machine according to one example of the present disclosure. The computing device 110 can be a physical host machine on which a first virtual machine 102a can run. For example, the computing device 110 can be a laptop, tablet, smartphone, or another suitable computing device. The computing device 110 can be connected to or communicatively coupled with the target hardware device 120. Examples of the target hardware device 120 can include Field Programmable Gate Array (FGPA) boards, peripheral devices, or other suitable hardware devices. The peripheral devices can be interface cards, keyboards, flash drives, video monitors, microphones, or other suitable peripheral devices.

The computing device 110 can include a first hypervisor 104a. The first hypervisor 104a can be referred to herein as a host hypervisor. The first hypervisor 104a can be computer software that manages the first virtual machine 102a. The first hypervisor 104a may be a software layer on top of a host OS of the computing device 110. The first hypervisor 104a can allocate resources from the computing device 110 such as CPU resources, memory, bandwidth, disk storage space, etc. to the first virtual machine 102a. This can enable the first virtual machine 102a to run programs or otherwise operate like a separate computing device using the resources of the computing device 110.

The first virtual machine 102a can transmit a first request 112a to the first hypervisor 104a, for example in response to detecting an event. The first hypervisor 104a can receive the first request 112a from the first virtual machine 102a. The first request 112a can take any suitable form. For example, the first request 112a may be a virtual machine (VM) call executed by the first virtual machine 102a. The VM call can trigger a VM exit to the first hypervisor 104a. The first virtual machine 102a can transmit the first request 112a while in a non-root mode, which can be an operational mode of the first virtual machine 102a. The VM exit may trigger a transition from the non-root mode to a root mode of the first hypervisor 104a. The first hypervisor 104a can operate in the root mode. In some examples, root mode can be more privileged than non-root mode to enable the first hypervisor 104a to perform operations or access information that the first virtual machine 102a may not be able to perform or access.

The first request 112a can indicate a target power mode 114 for the target hardware device 120. For example, the first request 112a can include a power-mode identifier associated with the target power mode 114. In an example, the target hardware device 120 can be a FPGA board and the first virtual machine 102a can determine that it wants to put the FGPA board in a low-power mode. Thus, the first request 112a can include a power-mode identifier of zero which can correspond to the low-power mode of the FGPA board.

After receiving the first request 112a, the first hypervisor 104a can transmit a second request 112b to a second hypervisor 104b. The second request 112b can have any suitable format and can be issued in any suitable way. The second request 112b can also indicate the target power mode 114 and the target hardware device 120 to the second hypervisor 104b. For example, the second request 112b can include the power-mode identifier of zero.

In some examples, the second request 112b can be another VM call that causes the processor 106 to enter a System Management Mode (SMM) 107. For example, the VM call can trigger a SMI 108, which can be a hardware interrupt that causes a processor 106 to suspend execution of operations and enter SMM 107. The SMM 107 can be an operational mode in which the processor 106 can execute code from read-only memory 106b. The read-only memory 106b can be separate from regular memory (e.g., RAM) used by the host OS. The SMM 107 can suspend normal operations performed by the processor and cause execution of alternate software with higher privileges. In some examples, the second hypervisor 104b can be executed by the processor 106 in the SMM 107. Thus, the second hypervisor 104b can be associated with the read-only memory 106b, while the first hypervisor 104a and virtual machine can be associated with the RAM 106a. The read-only memory 106b and the RAM 106a can be separate physical memory devices, collectively represented as memory device 105 in FIG. 1.

The second hypervisor 104b can receive the second request 112b and, in some examples, may validate the second request 112. For instance, the second request 112b may be deemed invalid by the second hypervisor 104b if it contains an unknown power-mode identifier or if it is targeting a hardware device that is not assigned to the first virtual machine 102a. Additionally, the second hypervisor 104b may deem the second request 112b invalid if the target power mode 114 or the target hardware device 120 is not available to the second hypervisor 104b. If the second hypervisor 104b determines that the second request 112b is invalid, the second request 112b can be rejected by the second hypervisor 104b. The second hypervisor 104b may notify the first hypervisor 104a of the rejection, which in turn may notify the first virtual machine 102a of the rejection. As a result of this rejection, the target hardware device 120 may maintain its current power mode.

As alluded to above, the second hypervisor 104b can have higher privileges than the first hypervisor 104a due to the second hypervisor 104b executing in the privileged context of SMM 107. Additionally, a second virtual machine 102b can execute in the privileged context of the SMM 107 and have higher privileges than the first virtual machine 102a. The second virtual machine 102b can be launched, controlled, monitored, or a combination thereof by the second hypervisor 104b. As a result of these higher privileges, and in response to receiving and validating the second request 112b, the second hypervisor 104b can forward the second request 112b to the second virtual machine 102b, and the second virtual machine 102b can cause the target hardware device 120 to enter the target power mode 114. The target hardware device 120 can enter the target power mode 114 by switching from a current power mode to the target power mode 114, which may consume more or less power than the current power mode. For example, the second virtual machine 102b can interact with the FGPA board for causing the FGPA board to enter the low-power mode. In some examples, the second virtual machine 102b can interact with the target hardware device 120 by executing a software function 118 to cause the target hardware device 120 to enter the target power mode 114. For example, the second virtual machine 102b can call into device firmware of the target hardware device 120 to request the target power mode 114 for the target hardware device 120.

Figure 2:
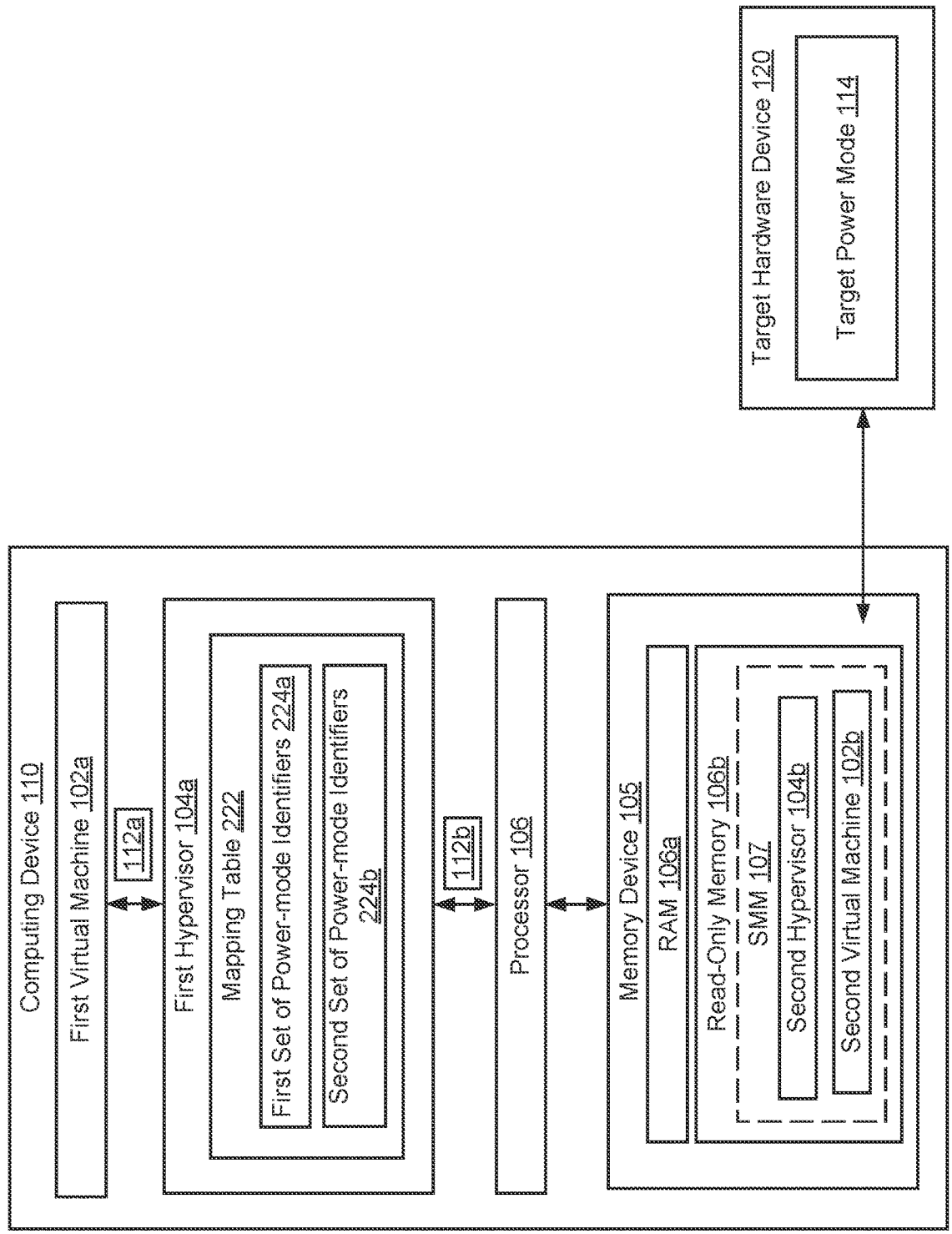
FIG. 2 is a block diagram of another example of a computing device for facilitating power management of a target hardware device by a virtual machine according to one example of the present disclosure.

FIG. 2 is a block diagram of another example of a computing device 110 for facilitating power management of a target hardware device 120 by a virtual machine according to one example of the present disclosure. The virtual machine can be a first virtual machine 102a running on the computing device 110. A first hypervisor 104a can manage the first virtual machine 102a. In some examples, the target hardware device 120 can be a graphics processing unit (GPU) or another piece of hardware that may be selectively attachable to the computing device and assignable to the first virtual machine 102a. The target hardware device 120 may be physically integrated into the housing of the computing device 110. Alternatively, the target hardware device 120 may be external to the housing of the computing device 110 and connected to the computing device 110 via one or more cables.

In some examples, a service provider can charge a customer based on the customer's power consumption. Therefore, it may be desirable to reduce power consumption to the extent possible, to reduce associated costs. To help reduce power consumption, the first virtual machine 102a can detect events and cause the target hardware device 120 to switch between power modes in response to the detected events. For example, the first virtual machine 102a can detect an event associated with high GPU consumption and responsively transmit a first request 112a for causing the GPU to enter into a power-conservation mode. The first hypervisor 104a can receive the first request 112a, which can include a power-mode identifier of "2" corresponding to the power-conservation mode of the target hardware device 120. The first request 112a can be a first VM call or another suitable method of communication between the first virtual machine 102a and the first hypervisor 194b.

The first hypervisor 104a may determine the target power mode 114 for the target hardware device 120 based on a mapping table 222. For example, the first hypervisor 104a can generate the mapping table 222 that maps a first set of power-mode identifiers 224a to a second set of power-mode identifiers 224b. The first set of power-mode identifiers 224a can be real identifiers used by the target hardware device 120 to identify its built-in power modes. The second set of power-mode identifiers 224b can be defined by the computing device 110 and may be fake for the purposes of obfuscating the first set of power-mode identifiers 224a. In some examples, the first hypervisor 104a can define the second set of power-mode identifiers 224a, for example using a predefined algorithm. The first hypervisor 104a can provide the second set of power-mode identifiers 224a to the first virtual machine 102a for use by the first virtual machine 102a in requesting power modes. The first virtual machine 102a can, for example, use the second set of power-mode identifiers to formulate the first request 112a. By obfuscating the first set of power-mode identifiers from the first virtual machine 102a, the first hypervisor 104a can enable the first virtual machine 102a to request the target power mode 114 for the target hardware device 120 while mitigating a security risk for the computing device 110.

As one specific example, a high-power mode can have a real power-mode identifier of 0, and a power-conservation mode can have a real power-mode identifier of 1. The real power-mode identifiers can be included in the first set of power-mode identifiers 224a. The mapping table 222 can map the real power-mode identifiers to fake power-mode identifiers 10 and 11, respectively. The fake power-mode identifiers can be included in the second set of power-mode identifiers 224b. If the first virtual machine 102a wants the target hardware device 120 to enter the power-conservation mode, it can transmit the first request 112a with 11. The first hypervisor 104a can extract 11 from the first request 112a and, using the mapping table 222, determine that 11 corresponds to 1 in the first set of power-mode identifiers 224a.

The first hypervisor 104a can include the real power-mode identifier (e.g., 1) in the second request 112b to a second hypervisor 104b as an indication of the target power mode 114 for the target hardware device 120. The first hypervisor 104a can transmit the second request 112b to the second hypervisor 104b as a VM call, which can trigger a SMI. The SMI 108 can cause a processor 106 to suspend execution of instructions stored in RAM 106a and enter SMM 107. Additionally, the second hypervisor 104b can execute in a privileged context of the SMM 107 using the read-only memory 106b.

In some examples, the second hypervisor 104b can validate the second request 112b. The second request 112b can be validated by the second hypervisor 104b verifying that the request was initiated by the first virtual machine 102a, verifying that the second request 112b was received from the first hypervisor 104a, or by otherwise validating the second request 112b. If the second hypervisor 104b determines that a request is invalid, it can reject the second request 112b. If the second hypervisor 104b determines that the second request 112b is valid, it can forward the second request 112b to a second virtual machine 102b, which can also execute in the privileged context of SMM 107. In response to receiving the second request 112b, the second virtual machine 102b can execute a software function 118 to initiate the target power mode 114 in the target hardware device 120. For example, the software function 118 can execute a call based on the power-mode identifier in the second request 112b.

Figure 3:
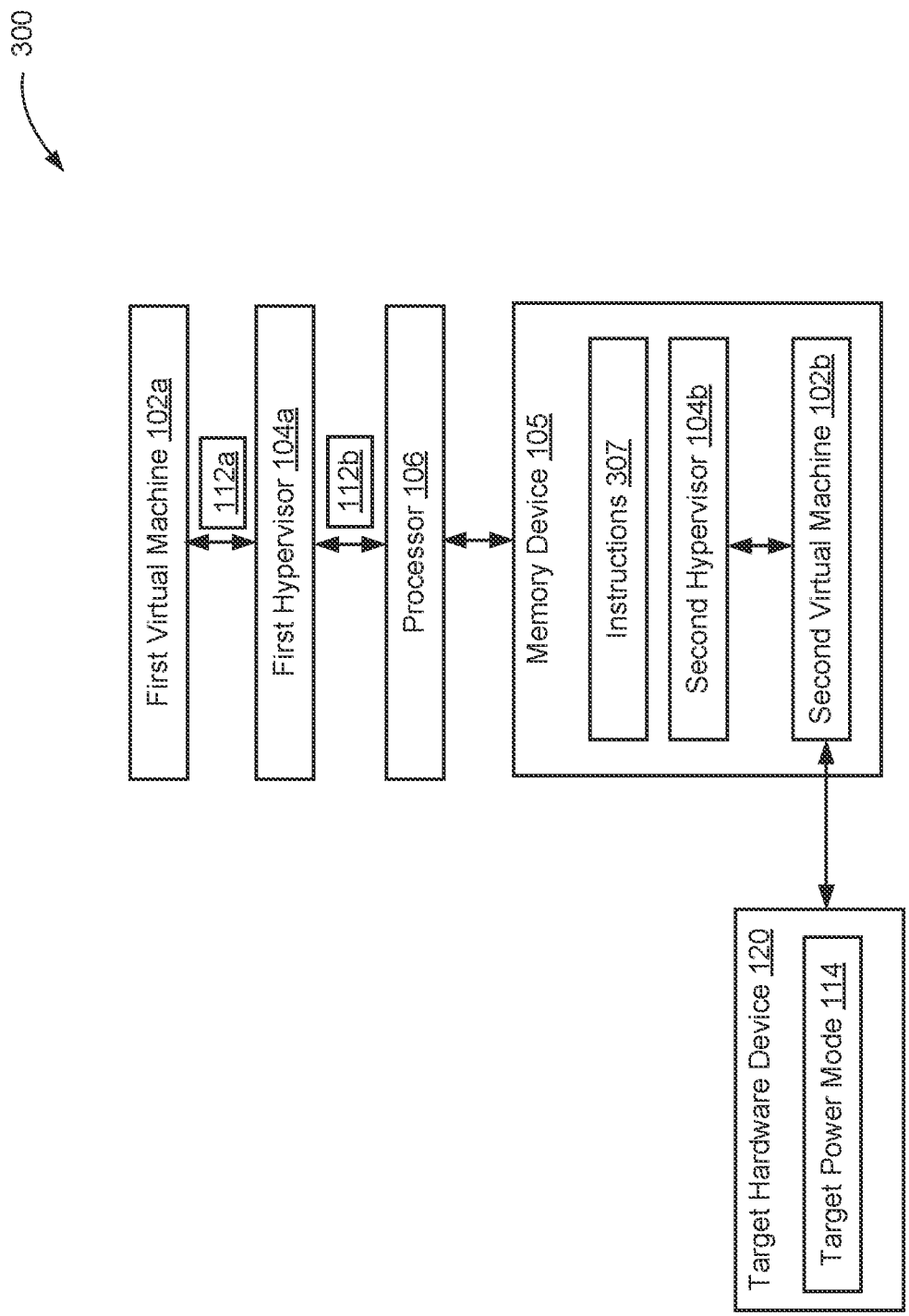
FIG. 3 is a block diagram of an example of a computing system for facilitating power management of a target hardware device by a virtual machine according to one example of the present disclosure.

FIG. 3 is a block diagram of an example of a computing system 300 for facilitating power management of a target hardware device 120 by a virtual machine according to one example of the present disclosure. The system 300 includes a processor 106 that is communicatively coupled to a memory device 105. In some examples, the processor 106 and the memory device 105 can be part of the same computing device, such as a server. In other examples, the processor 106 and the memory device 105 can be distributed from (e.g., remote to) one another.

The processor 106 is hardware and can include one processing device or multiple processing devices. Non-limiting examples of the processor 106 include a Field-Programmable Gate Array (FPGA), an application-specific integrated circuit (ASIC), or a microprocessor. The processor 106 can execute one or more operations for facilitating power management of the target hardware device 120 by the virtual machine. The processor 106 can execute instructions 307 stored in the memory device 105 to perform the operations. In some examples, the instructions 307 can include processor-specific instructions generated by a compiler or an interpreter from code written in any suitable computer-programming language, such as C, C++, C#, etc.

The memory device 105 is hardware and can include one memory device or multiple memory devices. Each memory device can be volatile or non-volatile. A non-volatile memory device can include any type of memory device that retains stored information when powered off. Non-limiting examples of the memory device 105 include electrically erasable and programmable read-only memory (EEPROM), flash memory, or any other type of non-volatile memory. At least some of the memory device 105 can include a non-transitory computer-readable medium from which the processor 106 can read instructions. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The processor 106 device can execute the instructions 307 to cause, for example, a first hypervisor 104a supporting a first virtual machine 102a to receive a first request 112a from the first virtual machine 102a. The first request 112a can indicate a target power mode 114 for the target hardware device 120 assigned to the first virtual machine 102a. The processor 106 can further cause the first hypervisor 104a to transmit a second request 112b to a second hypervisor 104b. The second hypervisor 104b may execute within a privileged context, on the host processor, that is separate from the host operating system. The second request 112b can indicate the target power mode for the target hardware device 120 to the second hypervisor 104b. The second hypervisor 104b can validate the second request 112b and, if it is valid, forward the second request 112b to a second virtual machine 102b. The second virtual machine 102b can also operate within the privileged context that is separate from the host operating system. The second virtual machine 102b can cause the target hardware device 120 to enter the target power mode 114 in response to receiving the second request 112b.

Figure 4:
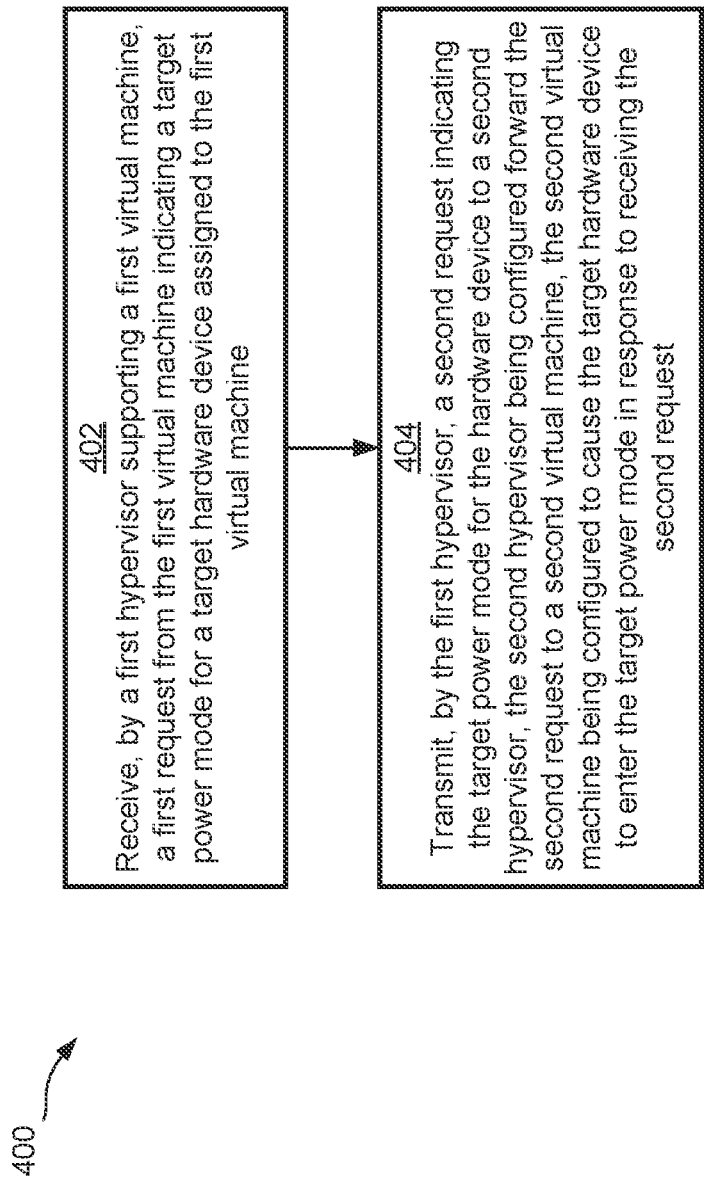
FIG. 4 is a flowchart of a process for facilitating power management of a target hardware device by a virtual machine according to one example of the present disclosure.

FIG. 4 is a flowchart of a process for facilitating power management of a target hardware device 120 by a virtual machine according to one example of the present disclosure. In some examples, the processor 106 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIGS. 1 and 2.

At block 402, the processor 106 can cause a first hypervisor 104a supporting a first virtual machine 102a to receive a first request 112a from the first virtual machine 102a. The first request 112a can indicate a target power mode 114 for a target hardware device 120 assigned to the first virtual machine 102a. The first request 112a can be a first VM call executed by the first virtual machine 102a to cause a VM exit to the first hypervisor 104a. The VM exit can be a transition from the first virtual machine 102a to the first hypervisor 104a to enable the first hypervisor 104a to perform operations. Additionally, the first request 112a may be transmitted by the first virtual machine 102a operating in non-root mode.

The first request 112a can include a first power-mode identifier that indicates the target power mode 114 for the target hardware device. In an example, the first hypervisor 104a can extract the first power-mode identifier and can include the first power-mode identifier in a second request 112b.

In other examples, the first hypervisor 104a may generate a mapping table 222 that correlates a first set of power-mode identifiers 224a to a second set of power-mode identifiers 224b. The first set of power-mode identifiers 224a can be real identifiers used by the target hardware device 120 to identify its built-in power modes. The second set of power-mode identifiers 224b can be a fake set of power-mode identifiers chosen by the computing device 110, for example using a predefined algorithm. Therefore, the first power-mode identifier in the first request 112a can be different from the second set of power-mode identifiers 224b. The first hypervisor 104a can correlate the first set of power-mode identifiers 224a to the second set of power-mode identifiers 224b in the mapping table 222. The first hypervisor 104a can provide the second set of power-mode identifiers 224a to the first virtual machine 102a, and can deny the first virtual machine 102a access to the first set of power-mode identifiers 224b. After the first hypervisor 104a extracts a fake power-mode identifier from the first request 112a, the first hypervisor 104a can use the mapping table 222 to determine a real power-mode identifier that corresponds to the fake power-mode identifier. The first hypervisor 104a can then include the real power-mode identifier in the second request 112b.

At block 404, the processor 106 can cause the first hypervisor 104a to transmit the second request 112b indicating the target power mode 114 for the target hardware device 120 to a second hypervisor 104b. The second hypervisor 104b can forward the second request 112b to a second virtual machine 102b. The second virtual machine 102b can cause the target hardware device 120 to enter the target power mode 114 in response to receiving the second request 112b. The second request 112b may be transmitted by the first hypervisor 104a operating in a root mode. The second request 112b can be a second VM call executed by the first hypervisor 104a to interface with the second hypervisor 104b. The second VM call can further trigger a SMI 108, which can cause the processor 106 to enter a SMM 107. The second hypervisor 104b and the second virtual machine 102b can execute in the privileged context associated with the SMM 107.

In some examples, the second virtual machine 102b can have access to firmware of the computing device 110 and/or the target hardware device 120. The second virtual machine 102b can execute a software function 118 in response to receiving the second request 112b from the second hypervisor 104b. The software function 118 can be configured to cause the second virtual machine 102b to call into the firmware to request the target power mode 114 for the target hardware device 120. In response, the target hardware device 120 can enter the target power mode 114.

In some examples, the second hypervisor 104b may validate the second request 112b prior to effectuating the switch to the target power mode 114. For example, the second hypervisor 104b may validate the second request 112b by verifying that the target hardware device 120 is assigned to the first virtual machine 102a, by detecting security risk for the computing device 110, or by otherwise determining whether the second request 112b is valid. In response to determining that the second request 112b is invalid, the second hypervisor 104b can cause the request for the target power mode 114 to fail. In response to determining that the second request 112b is valid, the second hypervisor 104b can forward the second request to the second virtual machine 102b, and the second virtual machine 102b can execute the software function 118 to cause the target hardware device 120 to enter the target power mode 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For example, various examples described herein may be combined together to produce further examples.

What is claimed is:

1. A system comprising:
 a processor; and
 a memory that includes instructions executable by the processor for causing the processor to perform operations comprising:
 receiving, by a first hypervisor supporting a first virtual machine, a first request from the first virtual machine indicating a target power mode for a target hardware device assigned to the first virtual machine, wherein the first request is a first virtual machine (VM) call executed by the first virtual machine to cause a VM exit to the first hypervisor; and
 in response to receiving the first request, transmitting, by the first hypervisor, a second request indicating the target power mode for the target hardware device to a second hypervisor, wherein the second request is a second VM call executed by the first hypervisor to interface with the second hypervisor, the second hypervisor being configured to forward the second request to a second virtual machine, the second virtual machine being configured to cause the target hardware device to enter the target power mode in response to receiving the second request.

2. The system of claim 1, wherein the second VM call is configured to trigger a system management interrupt that enables the processor to enter a system management mode, and wherein the second hypervisor and the second virtual machine are configured to execute within a privileged context of the system management mode.

3. The system of claim 1, wherein the first request comprises a first power-mode identifier indicating the target power mode for the target hardware device.

4. The system of claim 3, wherein the first hypervisor is configured to:
 generate a mapping table that correlates a first set of power-mode identifiers to a second set of power-mode identifiers, the second set of power-mode identifiers being different from the first set of power-mode identifiers;
 extract, from the first request, the first power-mode identifier associated with the target power mode, the first power-mode identifier being in the first set of power-mode identifiers;
 determine a second power-mode identifier that corresponds to the first power-mode identifier in the mapping table, the second power-mode identifier being in the second set of power-mode identifiers; and
 include the second power-mode identifier in the second request transmitted to the second hypervisor, the second hypervisor being configured to identify the target power mode based on the second power-mode identifier.

5. The system of claim 1, wherein the second hypervisor is configured to:
 validate the second request; and
 in response to determining that the second request is valid, forward the second request to the second virtual machine for causing the second virtual machine to execute a software function configured to cause the target hardware device to enter the target power mode.

6. A method comprising:
 receiving, by a first hypervisor supporting a first virtual machine, a first request from the first virtual machine indicating a target power mode for a target hardware device assigned to the first virtual machine, wherein the first request is a first virtual machine (VM) call executed by the first virtual machine to cause a first VM exit to the first hypervisor; and
 in response to receiving the first request, transmitting, by the first hypervisor, a second request indicating the target power mode for the target hardware device to a second hypervisor, wherein the second request is a second VM call executed by the first hypervisor to interface with the second hypervisor, the second hypervisor being configured to forward the second request to a second virtual machine, the second virtual machine being configured to cause the target hardware device to enter the target power mode in response to receiving the second request.

7. The method of claim 6, wherein the second VM call is configured to trigger a system management interrupt that enables a processor to enter a system management mode, and wherein the second hypervisor and the second virtual machine are configured to execute within a privileged context of the system management mode.

8. The method of claim 6, wherein the first request further comprises a first power-mode identifier indicating the target power mode for the target hardware device.

9. The method of claim 8, wherein the first hypervisor is configured to:
generate a mapping table that correlates a first set of power-mode identifiers to a second set of power-mode identifiers, the second set of power-mode identifiers being different from the first set of power-mode identifiers;
extract, from the first request, the first power-mode identifier associated with the target power mode, the first power-mode identifier being in the first set of power-mode identifiers;
determine a second power-mode identifier that corresponds to the first power-mode identifier in the mapping table, the second power-mode identifier being in the second set of power-mode identifiers; and
include the second power-mode identifier in the second request transmitted to the second hypervisor, the second hypervisor being configured to identify the target power mode based on the second power-mode identifier.

10. The method of claim 6, wherein the second hypervisor is configured to:
validate the second request; and
in response to determining that the second request is valid, forward the second request to the second virtual machine for causing the second virtual machine to execute a software function to cause the target hardware device to enter the target power mode.

11. A non-transitory computer-readable medium comprising instructions that are executable by a processor for causing the processor to perform operations comprising:
receiving, by a first hypervisor supporting a first virtual machine, a first request from the first virtual machine indicating a target power mode for a target hardware device assigned to the first virtual machine, wherein the first request is a first virtual machine (VM) call executed by the first virtual machine to cause a first VM exit to the first hypervisor; and
in response to receiving the first request, transmitting, by the first hypervisor, a second request indicating the target power mode for the target hardware device to a second hypervisor, wherein the second request is a second VM call executed by the first hypervisor to interface with the second hypervisor, the second hypervisor being configured to forward the second request to a second virtual machine, the second virtual machine being configured to cause the target hardware device to enter the target power mode in response to receiving the second request.

12. The non-transitory computer-readable medium of claim 11, wherein the second VM call is configured to trigger a system management interrupt that enables the processor to enter a system management mode, and wherein the second hypervisor and the second virtual machine are configured to execute within a privileged context of the system management mode.

13. The non-transitory computer-readable medium of claim 11, wherein the first request further comprises a first power-mode identifier indicating the target power mode for the target hardware device.

14. The non-transitory computer-readable medium of claim 13, wherein the first hypervisor is configured to:
generate a mapping table that correlates a first set of power-mode identifiers to a second set of power-mode identifiers, the second set of power-mode identifiers being different from the first set of power-mode identifiers;
extract, from the first request, the first power-mode identifier associated with the target power mode, the first power-mode identifier being in the first set of power-mode identifiers;
determine a second power-mode identifier that corresponds to the first power-mode identifier in the mapping table, the second power-mode identifier being in the second set of power-mode identifiers; and
include the second power-mode identifier in the second request transmitted to the second hypervisor, the second hypervisor being configured to identify the target power mode based on the second power-mode identifier.

15. The non-transitory computer-readable medium of claim 11, wherein the second hypervisor is configured to:
validate the second request; and
in response to determining that the second request is valid, forward the second request to the second virtual machine for causing the second virtual machine to execute a software function to cause the target hardware device to enter the target power mode.

16. A system comprising:
a processor; and
a memory that includes instructions executable by the processor for causing the processor to perform operations comprising:
generating, by a first hypervisor, a mapping table that correlates a first set of power-mode identifiers to a second set of power-mode identifiers, the second set of power-mode identifiers being different from the first set of power-mode identifiers;
receiving, by the first hypervisor supporting a first virtual machine, a first request from the first virtual machine indicating a target power mode for a target hardware device assigned to the first virtual machine, wherein the first request comprises a first power-mode identifier indicating the target power mode for the target hardware device;
extracting, by the first hypervisor and from the first request, the first power-mode identifier associated with the target power mode, the first power-mode identifier being in the first set of power-mode identifiers;
determining, by the first hypervisor, a second power-mode identifier that corresponds to the first power-mode identifier in the mapping table, the second power-mode identifier being in the second set of power-mode identifiers; and
in response to receiving the first request, transmitting, by the first hypervisor, a second request to a second hypervisor, wherein the second request includes the second power-mode identifier, the second hypervisor being configured to identify the target power mode based on the second power-mode identifier and forward the second request to a second virtual machine, the second virtual machine being configured to cause the target hardware device to enter the target power mode in response to receiving the second request.

17. A method comprising:
generating, by a first hypervisor, a mapping table that correlates a first set of power-mode identifiers to a second set of power-mode identifiers, the second set of power-mode identifiers being different from the first set of power-mode identifiers;
receiving, by the first hypervisor supporting a first virtual machine, a first request from the first virtual machine indicating a target power mode for a target hardware device assigned to the first virtual machine, wherein the first request comprises a first power-mode identifier indicating the target power mode for the target hardware device;
extracting, by the first hypervisor and from the first request, the first power-mode identifier associated with the target power mode, the first power-mode identifier being in the first set of power-mode identifiers;
determining, by the first hypervisor, a second power-mode identifier that corresponds to the first power-mode identifier in the mapping table, the second power-mode identifier being in the second set of power-mode identifiers; and
in response to receiving the first request, transmitting, by the first hypervisor, a second request to a second hypervisor, wherein the second request includes the second power-mode identifier, the second hypervisor being configured to identify the target power mode based on the second power-mode identifier and forward the second request to a second virtual machine, the second virtual machine being configured to cause the target hardware device to enter the target power mode in response to receiving the second request.

* * * * *